(12) United States Patent
Zhang et al.

(10) Patent No.: US 12,547,670 B2
(45) Date of Patent: Feb. 10, 2026

(54) OPERATION APPARATUS

(71) Applicant: Cambricon Technologies Corporation Limited, Beijing (CN)

(72) Inventors: Yingnan Zhang, Beijing (CN); Hongbo Zeng, Beijing (CN); Yao Zhang, Beijing (CN); Shaoli Liu, Beijing (CN); Di Huang, Beijing (CN); Shiyi Zhou, Beijing (CN); Xishan Zhang, Beijing (CN); Chang Liu, Beijing (CN); Jiaming Guo, Beijing (CN); Yufeng Gao, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 17/773,446

(22) PCT Filed: Sep. 3, 2020

(86) PCT No.: PCT/CN2020/113162
§ 371 (c)(1),
(2) Date: Apr. 29, 2022

(87) PCT Pub. No.: WO2021/082723
PCT Pub. Date: May 6, 2021

(65) Prior Publication Data
US 2023/0039892 A1  Feb. 9, 2023

(30) Foreign Application Priority Data

Nov. 1, 2019 (CN) .......................... 201911061951.9

(51) Int. Cl.
*G06F 17/14* (2006.01)
*G06F 7/50* (2006.01)
*G06F 7/523* (2006.01)

(52) U.S. Cl.
CPC .............. *G06F 17/144* (2013.01); *G06F 7/50* (2013.01); *G06F 7/523* (2013.01)

(58) Field of Classification Search
CPC ........ G06F 17/144; G06F 17/156; G06F 7/50; G06F 7/523; G06N 3/04; G06N 3/0464; G06N 3/063
See application file for complete search history.

(56) References Cited

U.S. PATENT DOCUMENTS

2018/0349317 A1* 12/2018 Deng .................... G06F 30/398
2019/0042923 A1* 2/2019 Janedula ................ G06N 3/044

FOREIGN PATENT DOCUMENTS

CN    107451652 A    12/2017
CN    108875908 A    11/2018
(Continued)

OTHER PUBLICATIONS

D.A. Patterson et al., Computer Organization and Design, the Hardware/Software Interface, 3rd edition, Elsevier, 2005 (Year: 2005).*

(Continued)

*Primary Examiner* — Emily E Larocque
(74) *Attorney, Agent, or Firm* — Getech Law LLC; Jun Ye (57) ABSTRACT

The present disclosure includes an operation apparatus configured to perform a winograd convolution operation. A control circuit of the operation apparatus is configured to send a control instruction to instruct a compute circuit to perform the winograd convolution operation. The computer circuit is configured to extract data from the storage circuit for the winograd convolution operation in response to the control instruction and disassembles a transformation operation into multiple summation operations.

8 Claims, 4 Drawing Sheets

(56) References Cited

FOREIGN PATENT DOCUMENTS

| | | |
|---|---|---|
| CN | 109117187 A | 1/2019 |
| CN | 109325591 A | 2/2019 |
| CN | 109388777 A | 2/2019 |
| CN | 110097172 A | 8/2019 |
| NO | 2021082723 A1 | 5/2021 |

OTHER PUBLICATIONS

International Search Report dated Nov. 27, 2020, English translation (Year: 2020).*
PCT/CN2020/113162—International Search Report, mailed Nov. 27, 2020, 4 pages. (with English translation).
CN201911061951.9—First Office Action mailed on Jun. 22, 2024, 24 pages.

* cited by examiner

Fig. 6

OPERATION APPARATUS

CROSS-REFERENCE TO RELATED APPLICATIONS

This application is a national stage filing of International Application No. PCT/CN2020/113162, filed Sep. 3, 2020, which claims priority to Chinese patent application No. 2019110619519 filed on Nov. 1, 2019 and entitled "OPERATION APPARATUS". The content of the applications are is herein incorporated by reference in its their entirety.

TECHNICAL FIELD

This disclosure relates to the field of artificial intelligence technology, and in particular relates to an operation apparatus.

BACKGROUND

With the development of artificial intelligence technology, various operation apparatuses and networks containing operation apparatuses used to implement artificial intelligence technology are widely used in fields such as computer vision and natural language processing.

In order to adapt to increasingly demanding tasks, networks containing operation apparatuses are becoming larger and larger, requiring larger amounts of operations, especially convolution operations. When performing convolution operations, the existing operation apparatuses cause high power consumption and spend long operation time, which have a negative impact on their application in the field of artificial intelligence technology.

SUMMARY

In view of the situation above, it is necessary to provide an operation apparatus that can speed up the operation, reduce the operation time and lower the power consumption in response to the technical problems.

A first aspect of this disclosure embodiment provides an operation apparatus which is configured to perform a winograd convolution operation. The apparatus includes a control unit, a storage unit, and a compute unit.

The control unit is configured to send a control instruction. The control instruction is configured to instruct the compute unit to perform the winograd convolution operation.

The storage unit is configured to store data for the winograd convolution operation.

The compute unit is configured to extract data from the storage unit for the winograd convolution operation in response to the control instruction. The compute unit disassembles a transformation operation on the data in the winograd convolution operation into a summation operation and completes a winograd transformation on the data according to the summation operation.

A second aspect of the embodiment of the present disclosure provides an artificial intelligence chip which includes an operation apparatus as described in any one of the first aspect of the present disclosure.

A third aspect of the embodiment of the present disclosure provides an electronic device which includes an artificial intelligence chip as described in the second aspect of the present disclosure.

A fourth aspect of the embodiment of the present disclosure provides a board card which includes a storage component, an interface device, a control component, and an artificial intelligence chip as described in the second aspect of the present disclosure.

The artificial intelligence chip is connected to the storage component, the control component and the interface device respectively.

The storage component is configured to store data.

The interface device is configured to implement data transmission between the artificial intelligence chip and an external device.

The control component is configured to monitor a state of the artificial intelligence chip.

A fifth aspect of the embodiment of the present disclosure provides an operation method applied to an operation apparatus. The operation apparatus includes a control unit, a storage unit, and a compute unit.

The control unit sends a control instruction which is configured to instruct the compute unit to perform a winograd convolution operation.

The storage unit stores the data for the winograd convolution operation.

The compute unit, in response to the control instruction, extracts data from the storage unit for the winograd convolution operation. The compute unit disassembles a transformation operation on the data in the winograd convolution operation into a summation operation and completes a winograd transformation on the data according to the summation operation.

Hereinabove, in the embodiment of this disclosure, the control unit sends the control instruction which is used to instruct the compute unit to perform the winograd convolution operation. The storage unit stores the data for the winograd convolution operation. The compute unit, in response to the control instruction, extracts the data from the storage unit for the winograd convolution operation. The compute unit disassembles the transformation operation on the data in the winograd convolution operation into the summation operation, and completes the winograd transformation on the data according to the summation operation. By replacing a large number of multiplication operations in the transformation operation with the addition operation, the speed of the winograd convolution operation may be accelerated, and the operation resources may be saved. The solution provided by this disclosure can reduce the resource consumption of convolution operation, speed up the convolution operation and reduce the operation time.

DESCRIPTION OF THE DRAWINGS

In order to illustrate the technical solutions in the embodiments or prior art of the present disclosure more clearly, the following is a brief description of the drawings that need to be used in the description of the embodiments or prior art.

The reference signs used in FIGS. 1-6 are as below:

10: operation apparatus;

11: control unit;
12: storage unit;
13: compute unit;
131: first compute unit;
132: second compute unit;
1321: multiplication unit;
1322: inverse transformation unit;
141: addition unit;
142: multiplication unit;
389: chip;
390: storage component;
391: interface device;
392: control component.

DETAILED DESCRIPTION

Technical solutions in embodiments of the present disclosure will be described clearly and completely hereinafter with reference to the drawings in the embodiments of the present disclosure. Obviously, the embodiments to be described are merely some rather than all examples of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" appear in the claims, the specification, and drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

In order to make the technical solution of the present disclosure to be clearly understood, the technical terms involved in the prior art and the embodiments of the present disclosure are explained hereinafter.

Convolution operation: convolution operation refers to opening an active window with the same size as the template starting from the upper left corner of the image. The active window corresponds to a window image which is a convolution kernel. The window image and the corresponding pixels in the image are multiplied and then added, and the result of the operation is used as a first pixel value of a new image after the convolution operation. Thereafter, the active window is moved one column to the right, the window image corresponding to the active window and the corresponding pixels in the image are multiplied and then added. The result of the operation is used as a second pixel value of the new image after the convolution operation. By analogy, from left to right and from top to bottom, a new image can be got.

Winograd convolution: winograd convolution is a kind of convolution acceleration implementation based on polynomial interpolation algorithm. A winograd convolution forward transformation is performed on two inputs of the convolution operation: a first target matrix and a second target matrix. Then an element-wise multiplication is performed on the first target matrix and the second target matrix that are forwardly transformed, and finally a winograd convolution inverse transformation is performed on a result of the element-wise multiplication to obtain a convolution result equivalent to the original convolution operation.

In existing artificial intelligence techniques, features are usually extracted based on the convolution operations of the processor, such as the computational processing of feature data in neural networks. The convolution layer in the neural network convolves the input feature data with a predetermined convolution kernel and outputs the result of the operation. The convolution layer may contain a plurality of convolution layers set adjacent to each other, and the result of operation obtained in each convolution layer is the feature data input to the previous convolution layer.

For each convolution layer, the existing convolution operation takes the convolution kernel containing the weight data as the window which "slides" on the matrix of the input feature data, matrix multiplication is performed on the local matrix at each sliding position and the final result of operation is obtained according to the result of matrix multiplication. It can be seen that the existing convolution operation requires a large number of matrix multiplications, and matrix multiplication requires the accumulation of matrix elements in each row of the feature data and matrix elements in each column of the convolution kernel, which causes a huge amount of computation, inefficient processing, and large energy consumption.

Figure 1:
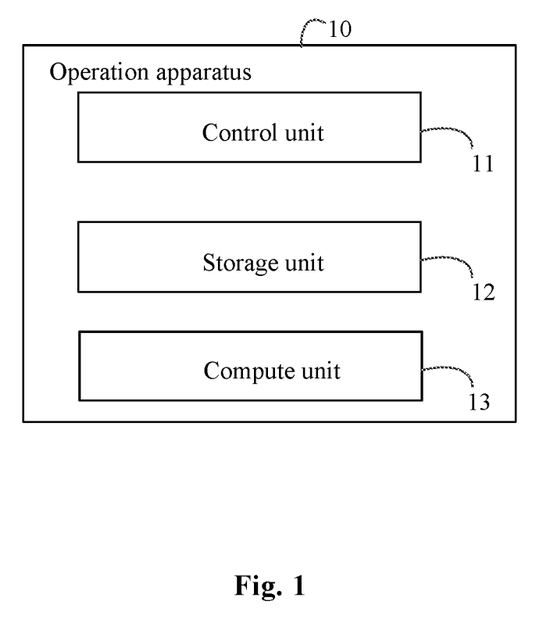
FIG. 1 is a block diagram showing the structure of an operation apparatus in one embodiment.

In order to solve the problems, an embodiment of the present disclosure provides an operation apparatus for performing a winograd convolution operation. A transformation operation on data in the winograd convolution operation is further disassembled into a summation operation, and the winograd transformation of the data is completed according to the summation operation to realize the acceleration of the operation process. Referring to FIG. 1, a block diagram of the structure of the operation apparatus in one embodiment is shown. An operation apparatus 10, as shown in FIG. 1, includes a control unit 11, a storage unit 12 and a compute unit 13. The control unit 11 controls the storage unit 12 and the compute unit 13 by issuing an instruction to obtain a final result. In this embodiment, in the process of forward transformation of the feature data, the feature data is the target matrix in the process; in the process of forward transformation of weight data, the weight data is the target matrix in the process; in the process of inverse transformation of multiplication operation result, the result of multiplication operation is the target matrix in the process.

As shown in FIG. 1, the control unit 11 is configured to send a control instruction. The control instruction is configured to instruct the compute unit to perform a winograd convolution operation. For example, the control instruction may include a first instruction and a second instruction. The first instruction includes a forward transformation instruction, and the second instruction includes an element-wise multiplication instruction and an inverse transformation instruction. The control unit 11 is configured to send the first instruction and the second instruction to control the compute unit to extract data from the storage unit and perform corresponding winograd transformation.

The storage unit 12 is configured to store data for the winograd convolution operation. The data includes, for example, at least one of feature data and weight data. The winograd transformation includes a forward transformation and/or an inverse transformation. The compute unit 13 is configured to extract data from the storage unit for a winograd convolution operation in response to the control instruction. The compute unit disassembles the transformation operation on the data in the winograd convolution operation into a summation operation and completes the winograd transformation of the data according to the summation operation. In various embodiments of the present disclosure, the winograd convolution operation can be understood as being performed using the following equation:

$$S = A^T((GgG^T) \odot (B^T dB))A.$$

S denotes a convolution matrix, which means a result matrix obtained by convolving feature data with weight data; d denotes the feature data; g denotes the weight data; B denotes a feature transformation matrix that realizes the forward transformation of the feature data; $B^T$ denotes the transposition of B; G denotes a weight transformation matrix that realizes the forward transformation of the weight data; $G^T$ denotes the transposition of G; A is a transformation matrix that inverts the result of multiplication operation after element-wise multiplication; and $A^T$ is the transposition of A.

As the equation described above, several winograd transformations (forward or inverse) are required in the winograd convolution operation and these winograd transformations involve a plurality of multiplication operations. The present disclosure reduces speed of the winograd convolution operation and saves computing resources by disassembling the transformation operation on data (e.g., feature data) in the winograd convolution operation into a summation operation and completing the winograd transformation of the data according to the summation operation, and replacing a large number of multiplication operations in the transformation operation with an addition operation. The solution in this disclosure can reduce resource consumption of convolution operation, improve the speed of convolution operation and reduce operation time.

In some embodiments, the compute unit 13 is specifically configured to disassemble data into a plurality of sub-tensors, to perform a transformation operation on a plurality of sub-tensors and sum results of the plurality of sub-tensors to obtain a winograd transformation result of the data according to a result of summation.

The process of disassembling the data into a plurality of sub-tensors can be understood as: the compute unit is specifically for parsing the data to obtain a plurality of sub-tensors. The data is the sum of the plurality of sub-tensors. The number of the plurality of sub-tensors is the same as the number of non-zero elements in the data. Each of the sub-tensors has a single non-zero element. The non-zero elements in the sub-tensors are the same as those at corresponding positions in the data.

The following example of feature data d of X×Y scale illustrates the process of parsing the data by the compute unit to obtain a plurality of sub-tensors.

$$d = \begin{bmatrix} d_{00} & d_{01} & \ldots & \ldots & d_{0Y} \\ d_{3-10} & d_{3-11} & \ldots & \ldots & d_{1Y} \\ \ldots & \ldots & \ldots & \ldots & \ldots \\ d_{X0} & d_{X1} & \ldots & \ldots & d_{XY} \end{bmatrix}$$

The feature data d is disassembled into a plurality of sub-tensors:

$$\begin{bmatrix} d_{00} & d_{01} & \ldots & \ldots & d_{0Y} \\ d_{3-10} & d_{3-11} & \ldots & \ldots & d_{1Y} \\ \ldots & \ldots & \ldots & \ldots & \ldots \\ d_{X0} & d_{X1} & \ldots & \ldots & d_{XY} \end{bmatrix} =$$

$$\begin{bmatrix} d_{00} & 0 & \ldots & \ldots & 0 \\ 0 & 0 & \ldots & \ldots & 0 \\ \ldots & \ldots & \ldots & \ldots & 0 \\ 0 & 0 & 0 & 0 \end{bmatrix} + \ldots + \begin{bmatrix} 0 & 0 & \ldots & \ldots & 0 \\ 0 & 0 & \ldots & \ldots & 0 \\ \ldots & \ldots & \ldots & \ldots & 0 \\ 0 & 0 & 0 & d_{XY} \end{bmatrix}.$$

All elements in the feature data d are assumed as non-zero elements, therefore, X×Y sub-tensors can be obtained. In other embodiments, if only 3 elements of the feature data d are non-zero elements, then only 3 sub-tensors can be obtained, and no specific examples will be given here.

$$\begin{bmatrix} d_{00} & 0 & \ldots & \ldots & 0 \\ 0 & 0 & \ldots & \ldots & 0 \\ \ldots & \ldots & \ldots & \ldots & 0 \\ 0 & 0 & 0 & 0 \end{bmatrix}, \begin{bmatrix} 0 & d_{01} & \ldots & \ldots & 0 \\ 0 & 0 & \ldots & \ldots & 0 \\ \ldots & \ldots & \ldots & \ldots & 0 \\ 0 & 0 & 0 & 0 \end{bmatrix},$$

$$\ldots, \begin{bmatrix} 0 & 0 & \ldots & \ldots & 0 \\ 0 & 0 & \ldots & \ldots & 0 \\ \ldots & \ldots & \ldots & \ldots & 0 \\ 0 & 0 & 0 & d_{XY} \end{bmatrix}$$

Among the X×Y sub-tensors, the first sub-tensor, for example, has a single non-zero element $d_{00}$, and the rest of the elements are zero. This non-zero element of this sub-tensor, which is $d_{00}$, is the same as the element at the corresponding position in the feature data.

After disassembling a plurality of sub-tensors, the compute unit performs a transformation operation on the plurality of sub-tensors and sums them, and obtains the winograd transformation result of the data according to the result of the summation. Specifically, the compute unit obtains a winograd transformation result of a meta-tensor corresponding to each sub-tensor. The meta-tensor is a tensor in which the non-zero elements of the sub-tensor are set to 1. Values of the non-zero elements of the sub-tensor as coefficients are multiplied by a winograd transformation result of the corresponding meta-tensor to obtain a winograd transformation result of the sub-tensor. The winograd transformation results of a plurality of sub-tensors are added to obtain a winograd transformation result of the data.

As shown in the example of feature data d, the first sub-tensor can be taken as an example. The following meta-tensor can be obtained by setting the non-zero element $d_{00}$ to 1:

$$\begin{bmatrix} 1 & 0 & \ldots & \ldots & 0 \\ 0 & 0 & \ldots & \ldots & 0 \\ \ldots & \ldots & \ldots & \ldots & 0 \\ 0 & 0 & 0 & 0 \end{bmatrix}.$$

The following winograd transformation results can be obtained for a meta-tensor of the first sub-tensor:

$$B_{X\times X}^T \begin{bmatrix} 1 & 0 & \cdots & \cdots & 0 \\ 0 & 0 & \cdots & \cdots & 0 \\ \cdots & \cdots & \cdots & \cdots & 0 \\ 0 & 0 & 0 & 0 \end{bmatrix} B_{Y\times Y}.$$

The compute unit, specifically for each of the sub-tensor, multiplies the left side of the meta-tensor corresponding to the sub-tensor by a left multiplication matrix (for example, $B_{X\times X}^T$) and multiplies the right side by a right multiplication matrix (for example, $B_{Y\times Y}$) to obtain the winograd transformation result of the meta-tensor. The left multiplication matrix and the right multiplication matrix are both determined by the size of the sub-tensor and a winograd transformation type. The winograd transformation type includes a winograd transformation type of a forward transformation and a winograd transformation type of an inverse transformation.

In a specific implementation, transformation matrices (e.g., B, G, A) used to transform the data forwardly or inversely are determined by the size of the data, and the transformation matrices corresponding to data of different sizes are predetermined known matrices. Therefore, a winograd transformation result of a meta-tensor of the first sub-tensor can be understood as a constant matrix. Then, X×Y winograd transformation results corresponding to X×Y sub-tensors are summed up to obtain the following winograd transformation results of the feature data as below.

$$(B^T dB) = d_{00} B_{X\times X}^T \begin{bmatrix} 1 & 0 & \cdots & \cdots & 0 \\ 0 & 0 & \cdots & \cdots & 0 \\ \cdots & \cdots & \cdots & \cdots & 0 \\ 0 & 0 & 0 & 0 \end{bmatrix} B_{Y\times Y} +$$

$$\cdots + d_{XY} B_{X\times X}^T \begin{bmatrix} 0 & 0 & 0 & 0 \\ 0 & 0 & 0 & 0 \\ 0 & 0 & 0 & 0 \\ 0 & 0 & 0 & 1 \end{bmatrix} B_{Y\times Y}$$

The winograd transformation includes a forward transformation and/or an inverse transformation. The example is based on a winograd transformation of the feature data, and a transformation operation is disassembled into a summation operation, but the disassembly can also be used for a forward transformation $((GgG^T))$ of the weight data, and an inverse transformation of the result of an element-wise multiplication on $(A(GgG^T))$ and $((B^T dB))$, which will not be repeated here.

In some embodiments, the control instruction includes a first instruction and a second instruction. The first instruction includes a forward transformation instruction, and the second instruction includes an element-wise multiplication instruction and an inverse transformation instruction. The control unit 11 is configured to issue the first and second instructions. In some embodiments, the first and second instructions issued by the control unit 11 may be pre-extracted from the storage unit 12 or may be pre-written externally and stored in the control unit 11. For example, both a first instruction and a second instruction include an operation code and an operation address. The first instruction includes a forward transformation opcode and an operation address corresponding to the forward transformation instruction. The second instruction includes an element-wise multiplication opcode and an operation address corresponding to the element-wise multiplication instruction, and an inverse transformation opcode and an operation address corresponding to the inverse transformation instruction. Each instruction may include an operation code and one or more operation addresses. The operation address, specifically, may be a register address.

The storage unit 12 in FIG. 1 stores data. The data stored in the storage unit 12 may be, for example, data that the operation apparatus 10 needs to use in a winograd convolution operation. In the embodiment where the first instruction and the second instruction are pre-extracted from the storage unit 12, the data stored in the storage unit 12 contains the first instruction and the second instruction. The structure of the storage unit 12 may include, for example, registers, caches, and data input/output units.

As shown in FIG. 1, the compute unit 13, for extracting feature data from the storage unit 12 in response to the first instruction, performs a forward transformation on the feature data. The compute unit 13 disassembles the forward transformation of the feature data into a summation operation, and completes the forward transformation of the feature data according to the summation operation to obtain a result of feature transformation. Specifically, for example, when the compute unit 13 obtains the first instruction from the control unit 11, the compute unit 13 parses the first instruction to perform the forward transformation on the feature data. The compute unit 13 reads the feature data from the storage unit 12, performs the forward transformation on the feature data and obtains the result of feature transformation. The compute unit 13 can also obtain a feature transformation matrix corresponding to the feature data from the storage unit 12 according to the scale of feature data.

As shown in the FIG. 1, the compute unit 13 is also configured to obtain, in response to the second instruction, the result of a weight transformation after the forward transformation and to perform an element-wise multiplication on the result of weight transformation and the result of feature transformation to obtain a result of multiplication operation; the compute unit 13 performs an inverse transformation on the result of multiplication operation. The compute unit disassembles the inverse transformation of the result of multiplication operation into a summation operation and completes, according to the summation operation, the result of multiplication operation to obtain an operation result.

Specifically, for example, when the compute unit 13 obtains a second instruction from the control unit 11, an element-wise multiplication instruction and an inverse transformation instruction may be obtained. The compute unit 13 obtains a result of weight transformation and a result of feature transformation according to the element-wise multiplication instruction, and performs element-wise multiplication on the result of weight transformation and the result of feature transformation. It is possible to obtain a result of pre-stored weight transformation from the storage unit 12 when the result of feature transformation is obtained, and perform element-wise multiplication on the result of pre-stored weight transformation and the result of feature transformation; or it is possible to obtain the result of weight transformation and the result of feature transformation simultaneously, and then perform element-wise multiplication on them. The element-wise multiplication is a result of multiplication operation obtained by multiplying elements of two matrices at the same position in one-to-one correspondence, which does not change matrix size. After performing element-wise multiplication, the compute unit 13 obtains an inverse transformation matrix (e.g., A) corresponding to the result of multiplication operation according to the inverse transformation instruction, and performs an inverse transformation on the result of multiplication operation by the inverse transformation matrix to obtain the result of the operation. For example, if feature data is the feature data of the image to be processed, then the result of the operation obtained by the compute unit 13 can be understood as a feature extraction result of the image to be processed. In the process of the inverse transformation of the results of multiplication operation, it is possible to disassemble the inverse transformation of the result of multiplication operation into a summation operation and complete the inverse transformation of the result of multiplication operation according to the summation operation to obtain the result of operation, in the same way as disassembling a forward transformation of the feature data in the embodiment, which will not be repeated here.

The operation apparatus, by obtaining the result of feature transformation through the forward transformation of the feature data and performing the element-wise multiplication and inverse transformation on the result of weight transformation and the result of feature transformation, disassembles the inverse transformation of the result of multiplication into the summation operation, replaces a plurality of multiplication operations in the existing convolution operation with an addition operation. By reducing the multiplication operation, the operation apparatus accelerates the operation speed and reduces the resource consumption.

In the embodiments, the result of weight transformation can be obtained at the same time as the result of feature transformation, or it can be pre-stored before the result of feature transformation.

In some embodiments, the storage unit 12 is specifically configured to store weight data. As shown in FIG. 1, the compute unit 13 is specifically configured to extract weight data from the storage unit 12 and perform a forward transformation on the weight data. The compute unit disassembles the forward transformation of the weight data into a summation operation, and completes the forward transformation of the weight data according to the summation operation to obtain the result of a weight transformation.

In some other embodiments, the storage unit 12 is specifically configured to receive and store a result of weight transformation. The compute unit 13 is specifically configured to obtain the result of weight transformation from the storage unit 12 in response to the second instruction. For example, in this embodiment, when pre-storing weight data or before receiving a first instruction, the compute unit 13 may perform a forward transformation on the weight data, obtain the result of weight transformation, and store the result of weight transformation in the storage unit 12. Then, the compute unit 13 performs a forward transformation on the feature data in response to the first instruction to obtain a result of feature transformation. Consequently, the result of weight transformation can be extracted directly, reducing operation time of a winograd convolution operation. Finally, the compute unit 13, in response to the second instruction, extracts the result from the storage unit 12 to perform element-wise multiplication on the result of weight transformation and the result of feature transformation to obtain a result of multiplication operation; the compute unit 13 performs an inverse transformation on the result of multiplication operation. The compute unit 13 disassembles the inverse transformation of the result of multiplication operation into a summation operation and completes the inverse transformation of the result of multiplication operation according to the summation operation to obtain the result of the operation. Optionally, the process of forward transformation of the feature data by the compute unit 13 to obtain the result of feature transformation, and the process of performing element-wise multiplication on the result of weight transformation and the result of feature transformation by the compute unit 13 can be performed simultaneously to improve the speed and efficiency of the operation.

Optionally, the compute unit 13 obtains the weight data and the feature data from the storage unit 12 in response to the first instruction. The compute unit 13 firstly performs the forward transformation on the weight data and the feature data, respectively to obtain the result of weight transformation and the feature transformation. Then, the compute unit 13 performs element-wise multiplication and inverse transformation on the result of weight transformation and the result of feature transformation in response to the second instruction.

The compute unit 13 in the above embodiment can have various structures. For example, one compute unit 13 can include a first compute unit and a second compute unit; another compute unit 13 can include an addition unit and a multiplication unit. The two possible structures are illustrated below referring to the drawings.

Figure 2:
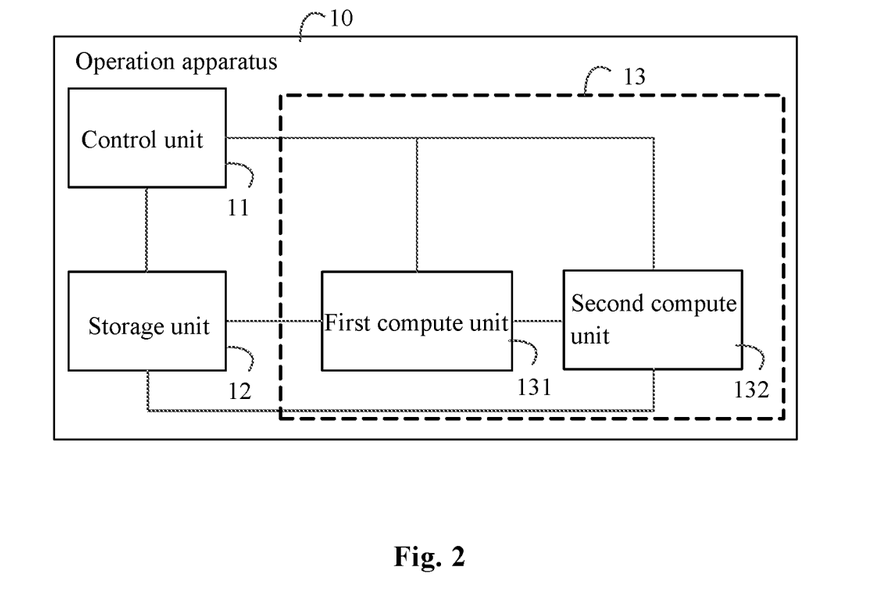
FIG. 2 is a block diagram showing the structure of the operation apparatus in a second embodiment.

FIG. 2 shows a block diagram of structure of an operation apparatus in a second embodiment. In the operation apparatus 10 shown in FIG. 2, the compute unit 13 may include a first compute unit 131 and a second compute unit 132.

The first compute unit 131, in response to the first instruction, is configured to extract feature data from the storage unit and perform a forward transformation on the feature data. The first compute unit 131 disassembles the forward transformation of the feature data into a summation operation, and completes the forward transformation of the feature data according to the summation operation to obtain a result of feature transformation. In some embodiments, the first compute unit 131, while performing the forward transformation on the feature data, may also obtain weight data from the storage unit 12 at the same time, perform a forward transformation on the weight data, and obtain a result of weight transformation. Then, both the obtained result of feature transformation and the result of weight transformation are sent to the second compute unit 132. In some other embodiments, since transmission bandwidth between the first compute unit 131 and the second compute unit 132 is limited, in order to reduce bandwidth usage, the first compute unit 131 may perform the forward transformation on the weight data before performing the forward transformation on the feature data, for example, before receiving the first instruction, in response to the first instruction, obtain the result of weight transformation, and store the result of weight transformation in the storage unit 12. When the first compute unit 131 sends the result of feature transformation to the second compute unit 132, the second compute unit 132 can directly obtain the result of weight transformation from the storage unit 12. Therefore, there is no need to transmit the result of weight transformation between the first compute unit 131 and the second compute unit 132, which reduces the requirement for transmission bandwidth between the first compute unit 131 and the second compute unit 132 and increases transmission speed.

The second compute unit 132 is configured to obtain a result of weight transformation in response to the second instruction and perform element-wise multiplication on the result of weight transformation and the result of feature transformation to obtain a result of multiplication operation; the second compute unit 132 is configured to perform an inverse transformation of the result of multiplication operation. The second compute unit 132 disassembles the inverse transformation operation on the result of multiplication operation in the inverse transformation into a summation operation, and completes the inverse transformation of the result of multiplication operation according to the summation operation to obtain a result of operation.

Figure 3:
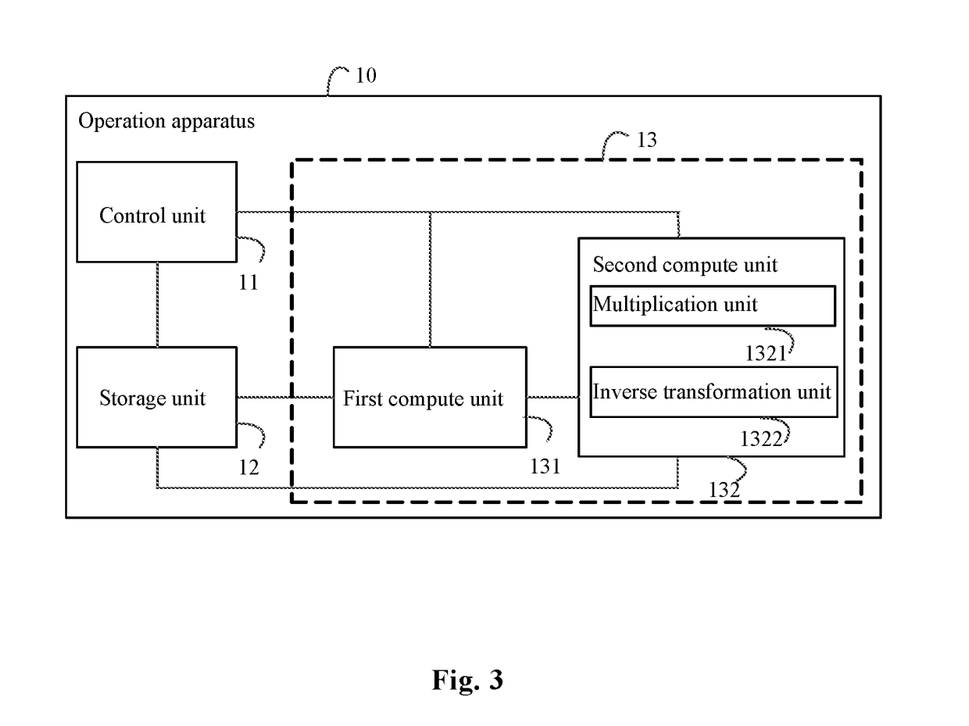
FIG. 3 is a block diagram showing the structure of the operation apparatus in a third embodiment.

FIG. 3 is a block diagram of the structure of the compute unit in a third embodiment. In the compute apparatus 10 shown in FIG. 3, the second compute unit 132 may specifically include a multiplication unit 1321 and an inverse transformation unit 1322.

The multiplication unit 1321 is configured to in response to the second instruction, obtain the result of a weight transformation and perform element-wise multiplication of the result of weight transformation and a result of feature transformation, to obtain a result of multiplication operation. The multiplication unit 1321, shown in FIG. 3, may obtain a pre-stored result of weight transformation from the storage unit 12 or obtain the result of weight transformation obtained by and from the first compute unit 131, without any limitation herein.

The inverse transformation unit 1322 is configured to invert a result of multiplication operation. The inverse transformation unit 1322 disassembles an inverse transformation of the result of multiplication operation in the inverse transformation into a summation operation, and completes the inverse transformation of the result of multiplication operation according to the summation operation to obtain a result of operation. Specifically, the inverse transformation unit 1322 may obtain from the storage unit 12 an inverse transformation matrix (e.g. A) for inverting the result of the multiplication operation, and invert the result of multiplication operation with the inverse transformation matrix to obtain the result of the operation.

Figure 4:
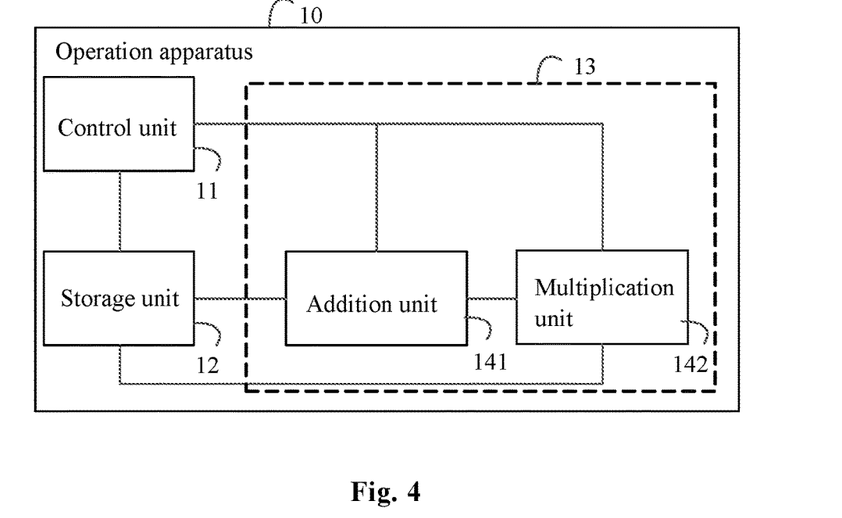
FIG. 4 is a block diagram showing the structure of the operation apparatus in a fourth embodiment.

FIG. 4 is a block diagram of structure of an operation apparatus in a fourth embodiment. In the operation apparatus 10 shown in FIG. 4, the compute unit 13 includes an addition unit 141 and a multiplication unit 142. In this embodiment, the process that can be done by addition in an operation process is performed by the addition unit 141, while an element-wise multiplication is performed by the dedicated multiplication unit 142.

The addition unit 141 is configured to obtain feature data from the storage unit 12 in response to the first instruction and to perform a forward transformation on the feature data. The addition unit 141 disassembles the forward transformation of the feature data into a summation operation, and completes the forward transformation of the feature data according to the summation operation to obtain a result of feature transformation. The addition unit 141 may perform a forward transformation on weight data before receiving the first instruction to obtain a result of weight transformation, and store the result of weight transformation in the storage unit 12. Consequently, there is no need to transmit the result of weight transformation between the addition unit 141 and the multiplication unit 142, which reduces requirement for transmission bandwidth and increasing transmission speed. Alternatively, the addition unit 141 may, in response to the first instruction, perform the forward transformation on the feature data while performing the forward transformation on the weight data, and after obtaining the result of weight transformation, transmit it to the multiplication unit 142 together with the result of feature transformation. The weight data may be the data stored in the storage unit 12.

The multiplication unit 142 is configured to obtain a result of weight transformation in response to the second instruction and perform element-wise multiplication on the result of weight transformation and the result of feature transformation to obtain a result of multiplication operation. The multiplication unit 142 multiplies elements with the same row and column in the result of weight transformation and the result of feature transformation in one-to-one correspondence to obtain the result of multiplication operation. For example, for a 4×4 forwardly transformed weight matrix and a transformed result of feature data, a total of 16 multiplications need to be performed to obtain a result of 4×4 multiplication operation.

The addition unit 141 is further configured to perform an inverse transformation on the result of multiplication operation in response to the second instruction. The addition unit 141 disassembles the inverse transformation of the result of multiplication operation into a summation operation and completes the inverse transformation of the result of multiplication operation according to the summation operation to obtain a result of operation. The addition unit 141 obtains the result of multiplication operation from the multiplication unit 142 and may obtain an inverse transformation matrix from the storage unit 12 to invert the result of multiplication operation with the inverse transformation matrix to obtain a result of operation.

Figure 5:
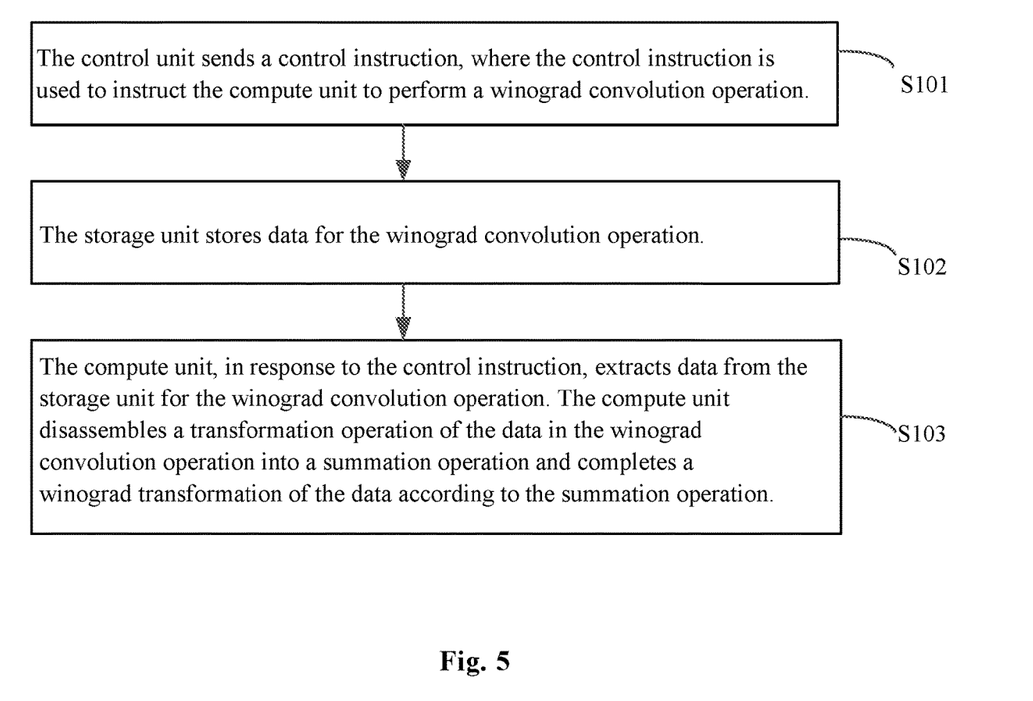
FIG. 5 is a flow diagram of the operation method in one embodiment.

FIG. 5 is a flow diagram of an operation method in one embodiment. The operation method shown in FIG. 5 is applied to the operation apparatus in the above embodiment which includes a control unit, a storage unit and a compute unit. The operation method shown in FIG. 5 includes the following steps.

S101, the control unit sends a control instruction, where the control instruction is used to instruct the compute unit to perform a winograd convolution operation.

S102, the storage unit stores data for the winograd convolution operation.

S103, the compute unit, in response to the control instruction, extracts data from the storage unit for the winograd convolution operation. The compute unit disassembles a transformation operation of the data in the winograd convolution operation into a summation operation and completes a winograd transformation of the data according to the summation operation.

In the operation method provided in this disclosure, a control instruction is sent through the control unit, and the control instruction is configured to instruct the compute unit to perform a winograd convolution operation. The storage unit stores the data for the winograd convolution operation. The compute unit, in response to the control instruction, extracts data from the storage unit to perform the winograd convolution operation. The compute unit disassembles a transformation operation on data in the winograd convolution operation into a summation operation and completes a winograd transformation of data according to the summation operation. The speed of the winograd convolution operation is accelerated and also operation resources are saved by replacing a plurality of multiplication operations in a transformation operation with an addition operation. The scheme provided in this disclosure can reduce resource consumption of a convolution operation, increase the speed of convolution operation and reduce operation time.

In some embodiments, the compute unit disassembles the data into a plurality of sub-tensors; the compute unit performs a transformation operation on the plurality of sub-tensors and sums the sub-tensors, and obtains a winograd transformation result of data based on a result of summation.

In some embodiments, the compute unit analyzes the data to obtain a plurality of sub-tensors. The data is a sum of the plurality of sub-tensors. The number of the plurality of sub-tensors is the same as the number of non-zero elements in the data, each of the sub-tensors has a single non-zero element, and the non-zero element in each of the sub-tensors is the same as the non-zero element in the corresponding position in the data.

In some embodiments, the compute unit obtains a winograd transformation result of a meta-tensor corresponding to each sub-tensor. The meta-tensor is a tensor in which a non-zero element of the sub-tensor is set to 1; a winograd transformation result of the sub-tensor is obtained by multiplying the value of the non-zero element of the sub-tensor as a coefficient by the winograd transformation result of the corresponding meta-tensor; and a winograd transformation result of the data is obtained by summing the winograd transformation results of the plurality of sub-tensors.

In some embodiments, the compute unit, for each the sub-tensor, multiplies a left side of a meta-tensor corresponding to the sub-tensor by a left multiplication matrix and multiplies a right side of the meta-tensor corresponding to the sub-tensor by a right multiplication matrix to obtain a winograd transformation result of the meta-tensor. The left multiplication matrix and the right multiplication matrix are both determined by a size of the sub-tensor and a winograd transformation type. The winograd transformation type includes the winograd transformation type of a forward transformation and the winograd transformation type of an inverse transformation.

In some embodiments, the data includes at least one of feature data and weight data.

The winograd transformation includes a forward transformation and/or an inverse transformation.

In some embodiments, the control instruction includes a first instruction and a second instruction. The first instruction includes a forward transformation instruction and the second instruction includes an element-wise multiplication instruction and an inverse transformation instruction.

The compute unit, in response to the first instruction, extracts the feature data from the storage unit, and performs a winograd convolution operation on the feature data. The compute unit disassembles a transformation operation of the feature data in the winograd convolution operation into a summation operation, and completes a forward transformation of the feature data according to the summation operation to obtain a result of feature transformation.

The compute unit, in response to the second instruction, further obtains a result of weight transformation that is forwardly transformed, performs element-wise multiplication on the result of weight transformation and the result of feature transformation to obtain a result of multiplication operation; the compute unit performs an inverse transformation on the result of multiplication operation. The compute unit disassembles the inverse transformation of the result of multiplication operation into a summation operation and completes the inverse transformation of the result of multiplication operation according to the summation operation to obtain a result of operation.

In some embodiments, the storage unit receives and stores a result of weight transformation.

The compute unit retrieves the result of weight transformation from the storage unit in response to the second instruction.

In some embodiments, the storage unit stores weight data.

The compute unit extracts weight data from the storage unit and performs a forward transformation on the weight data. The compute unit disassembles the forward transformation of the weight data into a summation operation and completes the forward transformation of the weight data according to the summation operation to obtain a result of weight transformation.

In some embodiments, the compute unit includes a first compute unit and a second compute unit.

The first compute unit extracts feature data from the storage unit in response to the first instruction and performs a forward transformation on the feature data. The first compute unit disassembles the forward transformation of the feature data into a summation operation and completes the forward transformation of the feature data according to the summation operation to obtain a result of feature transformation.

The second compute unit obtains a result of weight transformation in response to the second instruction and performs an element-wise multiplication on the result of weight transformation and the result of feature transformation to obtain a result of multiplication operation; the second compute unit performs an inverse transformation on the result of multiplication operation. The second compute unit disassembles the inverse transformation of the result of multiplication operation into a summation operation and completes the inverse transformation of the result of multiplication operation based on the summation operation to obtain a result of the operation.

In some embodiments, the second compute unit includes a multiplication unit and an inverse transformation unit.

The multiplication unit, in response to the second instruction, obtains a result of weight transformation after a forward transformation and performs an element-wise multiplication on the result of weight transformation and a result of a feature transformation to obtain a result of multiplication operation.

The inverse transformation unit performs an inverse transformation on the result of multiplication operation. The inverse transformation unit disassembles the inverse transformation of the result of multiplication operation into a summation operation and completes the inverse transformation of the result of multiplication operation according to the summation operation to obtain a result of operation.

In some embodiments, the compute unit includes an addition unit and a multiplication unit.

The addition unit obtains feature data from the storage unit in response to the first instruction and performs a forward transformation on the feature data. The addition unit disassembles the forward transformation of the feature data into a summation operation and completes the forward transformation of the feature data according to the summation operation to obtain a result of feature transformation.

The multiplication unit obtains a result of weight transformation in response to the second instruction and performs an element-wise multiplication of the result of weight transformation and the result of feature transformation.

The addition unit is further configured to perform an inverse transformation on the result of multiplication operation in response to the second instruction. The addition unit disassembles the inverse transformation of the result of multiplication operation into a summation operation and completes the inverse transformation of the result of multiplication operation according to the summation operation to obtain a result of operation.

It should be noted that the embodiments of method, for the sake of conciseness, are all described as a series of combinations of actions, but those skilled in the art should know that the present disclosure is not limited by the described order of action since the steps may be performed in a different order or simultaneously according to the present disclosure. Secondly, those skilled in the art should also understand that the embodiments described in the specification are all optional, and the actions and modules involved are not necessarily required for this disclosure.

It should be further explained that although the steps in the flowchart are shown sequentially as indicated by the arrows, the steps are not necessarily executed sequentially in the order indicated by the arrows. Unless as expressly stated herein, there is no strict order in which these steps are performed, and they may be performed in other orders. Moreover, at least some of the steps in the flowchart may include a plurality of sub-steps or a plurality of stages, which are not necessarily executed at the same time, but may be executed at different times, and the order of execution of these sub-steps or stages is not necessarily sequential, but may be executed alternately with other steps or sub-steps of some other steps or at least some of the stages of other steps.

It should be understood that the foregoing device embodiments are only illustrative, and the device of the present disclosure may also be implemented in other ways. For example, the division of the units/modules in the foregoing embodiment is only a logical function division, and there may be other division methods in actual implementation. For example, a plurality of units, modules, or components may be combined or integrated into another system, or some features may be omitted or not implemented.

In addition, unless otherwise specified, the functional units/modules in the various embodiments of the present disclosure may be integrated into one unit/module. Alternatively, each unit/module may exist alone physically. Alternatively, two or more units/modules may be integrated together.

The integrated units/modules can be implemented in the form of hardware or in the form of software program modules. When the integrated units/modules are implemented in the form of hardware, the hardware may be a digital circuit, an analog circuit, or the like. Physical implementation of the hardware structure may include, but is not limited to, a transistor, a memristor, and the like. If not specified, the artificial intelligence processor may be any suitable hardware processor, such as a CPU, a GPU, an FPGA, a DSP, an ASIC, and the like. If not specified, the storage unit may be any suitable magnetic storage medium or magneto-optical storage medium, such as, for example, an Resistive Random Access Memory (RRAM), a Dynamic Random Access Memory (DRAM), a Static Random Access Memory (SRAM), an Enhanced Dynamic Random Access Memory (EDRAM), a High-Bandwidth Memory (HBM), a Hybrid Memory Cube (HMC), and so on.

If the integrated units/modules are implemented in the form of software program modules and sold or used as an independent product, the product can be stored in a computer-readable memory. Based on such understanding, the essence of the technical solutions of the present disclosure, or a part of the present disclosure that contributes to the prior art, or all or part of technical solutions can be embodied in the form of a computer software product that is stored in a memory. The computer software product includes several instructions to enable a computer device (which may be a personal computer, a server, or a network device, etc.) to perform all or part of the steps of the methods described in the examples of the present disclosure. The foregoing memory includes a USB flash drive, a read-only memory (ROM), a random access memory (RAM), a mobile hard disk, a magnetic disk, or an optical disc, and other media that can store program codes.

In one possible implementation, an artificial intelligence chip is also disclosed, which includes the operation apparatus described above.

In one possible implementation, a board card is also disclosed, which includes a storage component, an interface device, a control component and the artificial intelligence chip. The artificial intelligence chip is connected to the storage component, the control device and the interface device, respectively. The storage component is configured to store data. The interface device is configured to implement data transmission between the artificial intelligence chip and an external device. The control component is configured to monitor the status of the artificial intelligence chip.

Figure 6:
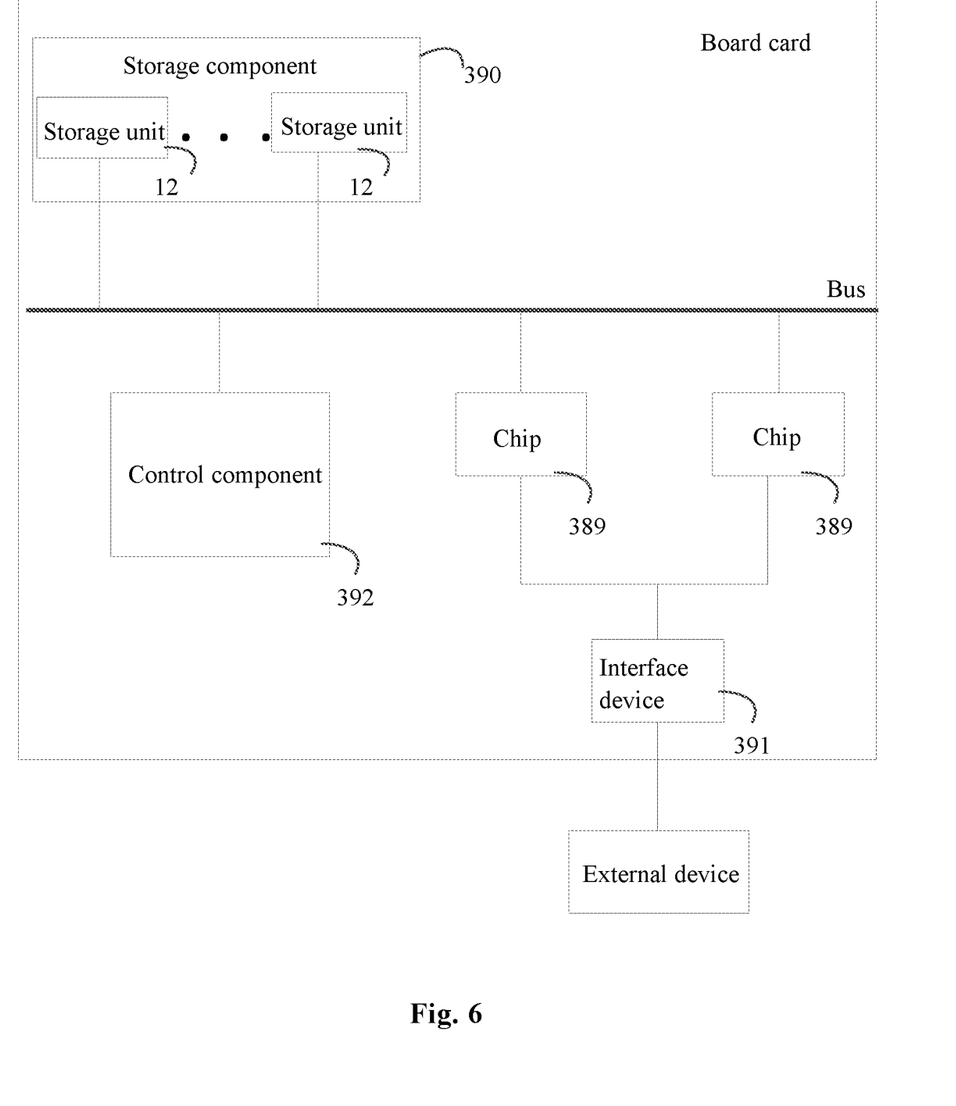
FIG. 6 is a block diagram showing the structure of a board card in one embodiment.

FIG. 6 illustrates a block diagram of structure of the board card according to an embodiment of the present disclosure. In FIG. 6, the board card may include, in addition to the chip 389, other supporting components which may include but are not limited to a storage component 390, an interface device 391, and a control component 392;

The storage component 390 is connected to the artificial intelligence chip through a bus, and is configured to store data. The storage component may include a plurality of groups of storage units 393. Each group of storage units is connected to the artificial intelligence chip through the bus. It can be understood that each group of the storage units can be DDR SDRAMs (Double Data Rate Synchronous Dynamic Random Access Memory).

DDR can double the speed of SDRAM without increasing the clock frequency. DDR allows data to be read out on the rising and falling edges of the clock pulse. DDR is twice as fast as a standard SDRAM. In an embodiment, the storage component may include 4 groups of the storage units. Each group of storage units may include a plurality of DDR4 particles (chips). In an embodiment, the artificial intelligence chip can include four 72-bit DDR4 controllers, with 64 bits of the 72-bit DDR4 controllers for data transmission and 8 bits for ECC checksum. It can be understood that when each group of the storage units adopts DDR4-3200 particles, the theoretical bandwidth of data transmission may reach 25600 MB/s.

In an embodiment, each group of the storage units may include a plurality of DDR SDRAMs arranged in parallel. DDR can transmit data twice per clock cycle. A DDR controller may be arranged inside the chip for controlling the data transmission and data storage of each storage unit.

The interface device may be electrically connected to the artificial intelligence chip. The interface device is configured to implement data transmission between the artificial intelligence chip and an external device, such as a server or a computer. In an embodiment, for example, the interface device may be a standard PCIE interface. For instance, data to be processed may be transferred by a server through the standard PCIE interface to the chip, thereby realizing data transfer. In some embodiments, theoretical bandwidth can reach 16,000 MB/s while using PCIE 3.0×16 interface. In another embodiment, the interface device may also be another interface. The present disclosure does not restrict a specific form of the another interface as long as the interface unit can realize the switching function. In addition, a result of the operation of artificial intelligence chip is still transmitted by the interface device back to the external device (e.g. a server).

The control component is electrically connected to the artificial intelligence chip. The control component is configured to monitor a state of the artificial intelligence chip. Specifically, the artificial intelligence chip and the control component may be electrically connected via an SPI interface. The control component may include an MCU (Micro Controller Unit). If the artificial intelligence chip includes a plurality of processing chips, a plurality of processing cores, or a plurality of processing circuits, the chip is capable of driving a plurality of loads. In this case, the artificial intelligence chip can be in different working states such as a multi-load state and a light-load state. The working state of the plurality of processing chips, the plurality of processing cores, or a plurality of processing circuits can be regulated and controlled by the control device.

In a possible implementation manner, electronic equipment is provided. The electronic equipment includes the artificial intelligence chip. The electronic equipment includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle includes an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical device may include a nuclear magnetic resonance spectrometer, a B-ultrasonic scanner, and/or an electrocardiograph.

In the embodiments above, the description of each embodiment has its own emphasis. For a part that is not described in detail in one embodiment, reference may be made to related descriptions in other embodiments. Each technical feature of the embodiments above can be randomly combined. For conciseness, not all possible combinations of the technical features of the embodiments above are described. Yet, provided that there is no contradiction, combinations of these technical features fall within the scope of the description of the present specification.

The foregoing can be better understood according to the following articles:

A1.
An operation method applied to an operation apparatus which comprises a control unit, a storage unit and a compute unit, wherein
the control unit sends a control instruction which is configured to instruct the compute unit to perform a winograd convolution operation,
the storage unit stores data for the winograd convolution operation; and
the compute unit, in response to the control instruction, extracts data from the storage unit for the winograd convolution operation, wherein the compute unit disassembles a transformation operation on the data in the winograd convolution operation into a summation operation and completes a winograd transformation on the data based on the summation operation.

A2.
The operation method of A1, wherein
the compute unit disassembles the data into a plurality of sub-tensors, performs the transformation operation on the plurality of sub-tensors and sums results of the transformation operation, and obtains a winograd transformation result of the data based on the result of the summation.

A3.
The operation method of A2, wherein
the compute unit parses the data to obtain the plurality of sub-tensors, wherein the data is a sum of the plurality of sub-tensors, the number of the plurality of sub-tensors is the same as the number of non-zero elements in the data, wherein each of the sub-tensors has a single non-zero element, and the non-zero element in each of the sub-tensors is the same as the non-zero element in a corresponding position in the data.

A4.
The operation method of A2, wherein
the compute unit obtains a winograd transformation result of a meta-tensor corresponding to each sub-tensor, wherein the meta-tensor is a tensor with the non-zero element of the sub-tensor set to 1; the compute unit multiplies the value of the non-zero element of the sub-tensor as a coefficient by a winograd transformation result of the corresponding meta-tensor to obtain the winograd transformation result of the sub-tensor; and winograd transformation results of the plurality of sub-tensors are summed to obtain the winograd transformation result of the data.

A5. The operation method of A4, wherein the compute unit multiplies, for each of the sub-tensor, a left side of the meta-tensor corresponding to the sub-tensor by a left multiplication matrix and multiplies a right side of the meta-tensor corresponding to the sub-tensor a right multiplication matrix to obtain the winograd transformation result of the meta-tensor, wherein the left multiplication matrix and the right multiplication matrix are both determined by a size of the sub-tensor and a winograd transformation type, wherein the winograd transformation type includes a winograd transformation type of a forward transformation and a winograd transformation type of an inverse transformation.

A6.
The operation method of A1-A5, wherein
the data includes at least one of feature data and weight data; and
the winograd transformation includes the forward transformation and/or the inverse transformation.

A7.
The operation method of A6, wherein the control instruction includes a first instruction and a second instruction, wherein the first instruction includes a forward transformation instruction, and the second instruction includes an element-wise multiplication instruction and an inverse transformation instruction;
the compute unit extracts the feature data from the storage unit in response to the first instruction and performs the winograd convolution operation on the feature data, wherein the compute unit disassembles the transformation operation on the feature data in the winograd convolution operation into a summation operation and completes a forward transformation on the feature data according to the summation operation to obtain a result of feature transformation; and
the compute unit further obtains, in response to the second instruction, a result of weight transformation that is forwardly transformed, performs an element-wise multiplication on the result of weight transformation and the result of feature transformation to obtain a result of multiplication operation; the compute unit performs an inverse transformation on the result of multiplication operation, wherein the compute unit disassembles the inverse transformation on the result of multiplication operation into the summation operation and completes the inverse transformation on the result of multiplication operation based on the summation operation to obtain a result of operation.

A8.
The operation method of A7, wherein
the storage unit receives and stores the result of weight transformation; and the compute unit extracts the result of weight transformation from the storage unit in response to the second instruction.

A9.

The operation method of A7, wherein the storage unit stores the weight data; and the compute unit extracts the weight data from the storage unit, and performs the forward transformation on the weight data, wherein the compute unit disassembles the forward transformation on the weight data into the summation operation and completes the forward transformation on the weight data based on the summation operation to obtain the result of weight transformation.

A10.

The operation method of A7, wherein the compute unit includes a first compute unit and a second compute unit, wherein in response to the first instruction, the first compute unit extracts the feature data from the storage unit and performs the forward transformation on the feature data, wherein the first compute unit disassembles the forward transformation on the feature data into the summation operation and completes the forward transformation on the feature data based on the summation operation to obtain the result of feature transformation; and in response to the second instruction, the second compute unit obtains the result of weight transformation, performs the element-wise multiplication on the result of weight transformation and the result of feature transformation to obtain the result of multiplication operation, and performs the inverse transformation on the result of multiplication operation, wherein the second compute unit disassembles the inverse transformation on the result of multiplication operation into the summation operation and completes the inverse transformation on the result of multiplication operation according to the summation operation to obtain the result of the operation.

A11.

The operation method of A10, wherein the second compute unit includes a multiplication unit and an inverse transformation unit, wherein in response to the second instruction, the multiplication unit obtains the result of weight transformation that is forwardly transformed, performing the element-wise multiplication on the result of weight transformation and the result of feature transformation to obtain the result of multiplication operation; and the inverse transformation unit performs the inverse transformation on the multiplication operation result, wherein the inverse transformation unit disassembles the inverse transformation on the result of multiplication operation into the summation operation and completes the inverse transformation on the result of multiplication operation based on the summation operation to obtain the result of operation.

A12.

The operation method of A7, wherein the compute unit includes an addition unit and a multiplication unit, wherein in response to the first instruction, the addition unit obtains the feature data from the storage unit, and performs the forward transformation on the feature data, wherein the addition unit disassembles the forward transformation on the feature data into the summation operation and completes the forward transformation on the feature data based on the summation operation to obtain the result of feature transformation;

in response to the second instruction, the multiplication compute unit obtains the result of weight transformation and performs the element-wise multiplication on the result of weight transformation and the result of feature transformation to obtain the result of the multiplication operation;

in response to the second instruction, the addition unit further performs the inverse transformation on the result of multiplication operation, wherein the addition unit disassembles the inverse transformation on the result of the multiplication operation into the summation operation and completes the inverse transformation on the result of multiplication operation based on the summation operation to obtain the result of operation.

The embodiments of the present disclosure are described in detail, and specific examples are applied in this paper to illustrate the principles and implementation of the present disclosure. The embodiments are described only to help understand the method of the present disclosure and its core ideas. Persons of ordinary skill in the art may change or transform the implementation and application scope according to the ideas of the present disclosure. The changes and transformations shall all fall within the protection scope of the present disclosure. In summary, the content of this specification should not be construed as a limitation on the present disclosure.

What is claimed is:

1. An operation apparatus configured to perform a winograd convolution operation in a neural network, the operation apparatus comprising:

a control circuit;

a storage circuit configured to store data related to an image; and a compute circuit including a first compute circuit and a second compute circuit, wherein the control circuit is configured to extract a plurality of control instructions from the storage circuit, the plurality of control instructions includes a first instruction and a second instruction, the first instruction includes a forward transformation instruction which is executable by the first compute circuit, the second instruction, executable by the second compute circuit, includes an element-wise multiplication instruction and an inverse transformation instruction, each of the first instruction and the second instruction includes register addresses, the data includes feature data and weight data, each of the first instruction and the second instruction is to perform the winograd convolution operation associated with each convolution layer of the neural network, the storage circuit is configured to store the data for the winograd convolution operation, the first compute circuit is configured to perform for each convolution layer of the neural network:

execute the forward transformation instruction on the weight data, execute the forward transformation instruction on the feature data, obtain a result of weight transformation based on the execution of the forward transformation instruction on the weight data, and store the result of the weight transformation in the storage circuit, the execution of the forward transformation instruction on the weight data is before the execution of the forward transformation instruction on the feature data, the second compute circuit is configured to perform for each convolution layer of the neural network:

obtain the result of weight transformation, in response to the second instruction, from the storage circuit, perform an element-wise multiplication on the result of weight transformation and the result of feature transformation to obtain a result of multiplication operation, perform an inverse transformation of the result of multiplication operation, disassemble the inverse transformation of the result of multiplication operation into a summation operation, and complete the inverse transformation of the result of multiplication operation according to the summation operation to obtain a result of the winograd convolution operation, wherein the compute circuit is further configured to:
parse the data to obtain a plurality of sub-tensors;
perform a transformation operation on the plurality of sub-tensors and sum results of the transformation operation; and
obtain a winograd transformation result of the data according to a result of the summation, wherein the winograd transformation result of the data is a sum of the plurality of sub-tensors, and number of the plurality of sub-tensors is same as number of non-zero elements in the data, and wherein each sub-tensor of the plurality of sub-tensors has a non-zero element, and the non-zero element in each sub-tensor of the plurality of sub-tensors is the same as a non-zero element in a corresponding position in the data.

2. The operation apparatus of claim 1, wherein the compute circuit is further configured to:

obtain a winograd transformation result of a meta-tensor corresponding to each sub-tensor, wherein the meta-tensor is a tensor with the non-zero element of the sub-tensor set to 1;

multiply a value of the non-zero element of the sub-tensor as a coefficient by the winograd transformation result of the corresponding meta-tensor to obtain the winograd transformation result of the sub-tensors; and sum winograd transformation results of the plurality of sub-tensors obtain the winograd transformation result of the data.

3. The operation apparatus of claim 2, wherein the compute circuit is further configured to:

multiply, for each sub-tensor, a left side of the meta-tensor corresponding to the sub-tensor by a left multiplication matrix; and multiply a right side of the meta-tensor corresponding to the sub-tensor by a right multiplication matrix to obtain the winograd transformation result of the meta-tensor, wherein the left multiplication matrix and the right multiplication matrix are both determined by a size of the sub-tensor and a winograd transformation type, and wherein the winograd transformation type includes a winograd transformation type of the forward transformation instruction and a winograd transformation type of the inverse transformation instruction.

4. The operation apparatus of claim 1, wherein the second compute circuit includes:

a multiplication circuit configured to:
obtain, in response to the second instruction, the result of weight transformation,
perform the element-wise multiplication on the result of weight transformation and the result of feature transformation to obtain the result of the multiplication operation; and an inverse transformation circuit configured to perform an inverse transformation on the result of multiplication operation, wherein
the inverse transformation circuit disassembles the transformation operation in the inverse transformation into the summation operations and completes the inverse transformation on the result of multiplication operation according to the summation operations to obtain the result of operation.

5. The operation apparatus of claim 1, wherein the compute circuit includes:

an addition circuit configured to:
obtain the feature data from the storage circuit in response to the first instruction, and
perform a forward transformation on the feature data, wherein the addition circuit disassembles the forward transformation into the summation operations and completes the forward transformation on the feature data based on the summation operations to obtain the result of feature transformation;

a multiplication circuit configured to:
obtain the result of weight transformation in response to the second instruction, and
perform the element-wise multiplication on the result of weight transformation and the result of feature transformation to obtain the result of multiplication operation; and the addition circuit further configured to:
perform, in response to the second instruction, an inverse transformation on the result of multiplication operation, wherein the addition circuit disassembles the inverse transformation into the summation operations and completes the inverse transformation on the result of multiplication operation according to the summation operations to obtain the result of operation.

6. An operation method applied to an operation apparatus which comprises a control circuit, a storage circuit and a compute circuit, wherein in the operation apparatus:

extracting, by the control circuit, a plurality of control instructions from the storage circuit, is wherein the plurality of control instruction is configured to instruct the compute circuit to perform a winograd convolution operation associated with each convolution layer of a neural network, wherein
the compute circuit includes a first compute circuit and a second compute circuit,
the plurality of control instructions includes a first instruction and a second instruction,
each of the first instruction and the second instruction includes register addresses,
the first instruction includes a forward transformation instruction which is executable by the first compute circuit, the second instruction, executable by the second compute circuit, includes an element-wise multiplication instruction and an inverse transformation instruction, the storage circuit stores data for the winograd convolution operation, wherein the data includes feature data and weight data, for each convolution layer of the neural network:
- executing, by the first compute circuit, the forward transformation instruction on the weight data,
- executing, by the first compute circuit, the forward transformation instruction on the feature data, wherein the execution of the forward transformation on the weight data is before the execution of the forward transformation on the feature data,
- obtaining, by the first compute circuit, a result of weight transformation based on the execution of the forward transformation on the weight data, and
- storing, by the first compute circuit, the result of weight transformation in the storage circuit,
- obtaining, by the second compute circuit, the result of weight transformation in response to the second instruction,
- performing, by the second compute circuit, element-wise multiplication on the result of weight transformation and the result of feature transformation to obtain a result of multiplication operation,
- performing, by the second compute circuit, an inverse transformation of the result of multiplication operation,
- disassembling, by the second compute circuit, the inverse transformation of the result of multiplication operation in into a summation operation, and
- completing, by the second compute circuit, the inverse transformation of the result of multiplication operation according to the summation operation to obtain a result of the winograd convolution operation,
- parsing, by the compute circuit, the data to obtain a plurality of sub-tensors,
- performing, by the compute circuit, a transformation operation on the plurality of sub-tensors and sums results of the transformation operation, and
- obtaining, by the compute circuit, a winograd transformation result of the data based on the result of the summation,
- wherein the winograd transformation result of the data is a sum of the plurality of sub-tensors, number of the plurality of sub-tensors is same as number of non-zero elements in the data,
- wherein each sub-tensor of the plurality of sub-tensors has a non-zero element, and
    - wherein the non-zero element in each sub-tensor of the plurality of sub-tensors is the same as a non-zero element in a corresponding position in the data.

7. The operation method of claim 6, further comprising:
- obtaining, by the compute circuit, a winograd transformation result of a meta-tensor corresponding to each sub-tensor, wherein the meta-tensor is a tensor with the non-zero element of the sub-tensor set to 1;
- multiplying, by the compute circuit, a value of the non-zero element of the sub-tensor as a coefficient by the winograd transformation result of the corresponding meta-tensor to obtain the winograd transformation result of the sub-tensor; and
- summing, by the compute circuit, winograd transformation results of the plurality of sub-tensors are summed to obtain the winograd transformation result of the data.

8. The operation method of claim 7, further comprising:
- multiplying, by the compute circuit, for each sub-tensor, a left side of the meta-tensor corresponding to the sub-tensor by a left multiplication matrix;
- multiplying, by the compute circuit, a right side of the meta-tensor corresponding to the sub-tensor a right multiplication matrix to obtain the winograd transformation result of the meta-tensor; and
- determining, by the compute circuit, the left multiplication matrix and the right multiplication matrix, by a size of the sub-tensor and a winograd transformation type, wherein the winograd transformation type includes winograd transformation type of a forward transformation and a winograd transformation type of an inverse transformation.

* * * * *